(12) United States Patent
Gronau et al.

(10) Patent No.: US 6,499,812 B1
(45) Date of Patent: Dec. 31, 2002

(54) METHOD AND DEVICE FOR ADJUSTING BRAKE PRESSURE AND FOR OPENING AN INLET VALVE

(75) Inventors: Ralph Gronau, Wetter (DE); Tobias Scheller, Frankfurt am Main (DE); Jürgen Woywod, Mörfelden (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/743,438

(22) PCT Filed: Jul. 9, 1999

(86) PCT No.: PCT/EP99/04843

§ 371 (c)(1),
(2), (4) Date: Apr. 12, 2001

(87) PCT Pub. No.: WO00/02753

PCT Pub. Date: Jan. 20, 2000

(51) Int. Cl.[7] .............................. B60T 1/00; B60T 8/32; B60T 8/48; B60T 8/40

(52) U.S. Cl. ................... 303/113.1; 303/10; 303/116.1; 303/DIG. 3; 303/166

(58) Field of Search ........................... 303/113.1, 116.1, 303/116.2, 116.3, 166, 167, DIG. 3, DIG. 4, 10–12, 119.1, 119.2, 116.4, 115.1–115.6; 318/370; 701/70, 80

(56) References Cited

U.S. PATENT DOCUMENTS 4,969,696 A * 11/1990 Yogo et al.
5,845,974 A * 12/1998 Kamikado et al. ........ 303/116.1
5,845,976 A * 12/1998 Muenster
6,155,653 A * 12/2000 Borchert ....................... 303/11
6,241,323 B1 * 6/2001 Wagner et al. ......... 303/DIG. 4

FOREIGN PATENT DOCUMENTS

| DE | 38 34 539 | 4/1990 |
| DE | 39 35 395 | 6/1990 |
| DE | 44 40 517 | 5/1996 |
| DE | 195 01 760 | 7/1996 |
| EP | 0 465 820 | 1/1992 |
| GB | 2 280 762 | 2/1995 |
| WO | 92 17356 | 10/1992 |
| WO | 96 10507 | 4/1996 |
| WO | 96 15927 | 5/1996 |
| WO | 97 23373 | 7/1997 |

* cited by examiner

Primary Examiner—Douglas C. Butler
(74) Attorney, Agent, or Firm—Rader, Fishman & Grauer PLLC

(57) ABSTRACT

A method of brake pressure adjustment in a vehicle brake system equipped with an electric hydraulic pump comprises the following steps: detecting a prevailing brake pressure or determining a nominal pressure, and actuating the pump by degrees according to the detected brake pressure or the nominal pressure. In a method of opening an inlet valve of a hydraulic vehicle brake system, a pressure rise on the inlet side of the inlet valve is generated when the difference between the outlet-side and the inlet-side pressure on the inlet valve exceeds a positive threshold value.

26 Claims, 4 Drawing Sheets

METHOD AND DEVICE FOR ADJUSTING BRAKE PRESSURE AND FOR OPENING AN INLET VALVE

TECHNICAL FIELD

The present invention generally relates to vehicle brakes, and more particularly relates to a system for adjusting brake pressure.

BACKGROUND OF THE INVENTION

Apart from a primary pressure source for hydraulic fluid (which is e.g. the brake cylinder/tandem master cylinder), modem vehicle brake systems include one or more hydraulic pumps by which hydraulic fluid that may also be pressurized can be supplied for certain purposes. These pumps may be pumps mounted on the valve block and actuated by way of an electric motor and an eccentric. The purpose of these pumps is to build up the pressure of the hydraulic brake fluid for specific controlling (e.g. traction slip control) or regulating purposes in case the brake pressure which originates from the main pressure source is not sufficient to achieve the objective of the control. Generally, for example, during traction slip control, the driver does not brake at all and accordingly the primary pressure source does not pressurize the hydraulic brake lines. Nevertheless, active pressure increase, especially on the brakes of the driven wheels, is often desirable for traction slip control. This pressure increase can be generated by the pump mentioned hereinabove.

Up to date, a pump of this type has been switched on and off electrically. The delivery rate and, thus, indirectly the brake pressure is adjusted in two different ways. On the one hand, the delivery volume of the pump can be limited on the suction side, for example, such that a valve between the fluid reservoir and the pump is opened and closed in conformity with defined criteria. The disadvantage is that the pump produces a vacuum on the suction side, which may cause leakage problems, e.g. with respect to low-pressure accumulators connected to the suction side of the pump. Another possibility of adjusting the brake pressure includes the actuation of the inlet valves of a wheel brake for pressure adjustment. This possibility is, however, disadvantageous because the pump operates in opposition to the closed valves. Noises develop therefrom which become audible to the driver and leave the impression that there is something malfunctioning with the vehicle brake system.

Further, the prior art method of installation of inlet valves requires non-return valves to avoid the possibility of sticking inlet valves. The case occurs relatively frequently that, based on an ABS brake operation, the brake pressure is decreased by the driver, with the inlet valve of the wheel brake being closed. On the other hand, the case occurs that a higher pressure prevails at the inlet valve on the outlet side (brake side) than on the inlet side (pressure source side). To avoid a stuck condition of the valves in this situation, there is provision of non-return valves which permit pressure reduction past the inlet valve in a downstream direction. The arrangement of these non-return valves complicates the design of a valve block still further.

Besides, DE 44 405 17 A1 discloses a method and a device for actuation of a return pump of a brake system wherein brake pressure from the return pump is controllable in dependence on a controller which is adapted to influence the driving speed of a vehicle. The actuation for brake pressure adjustment is effected according to the wheel speeds. An object of the present invention is to provide an improved method and device for adjusting brake pressure and for opening an inlet valve.

For brake pressure adjustment, the pump is actuated electrically in such a fashion that it is operated by degrees, that means, that operating conditions, delivery rates, rotational speeds between on and off can also be adjusted. For example, the electric motor of the pump can receive a pulse-width-modulated signal so that the motor's rotational speed and, thus, the delivery rate, can be adjusted continuously or quasi continuously between 0 and 100% of the maximum rate of delivery. This eliminates the need for the strategies for brake pressure adjustment (suction-side limitation or limitation by the inlet valves upstream of the wheel brake) known from prior art so that the related disadvantages, too, are overcome. The pump itself will then be the decisive control element for the adjustment of the brake pressure, and the inlet valve and the valve on the suction side of the pump can remain open to full extent.

According to an advantageous design, the pump receives pulse-width-modulated minimum pulses between 5 and 20 milliseconds (ms), the minimum duration of which is so defined by the clock generator circuit or delay circuit that high 'disconnecting currents' are avoided to prevent thermal load on the circuit. In this arrangement, the pump is actuated by degrees according to the determined brake pressure or nominal pressure depending on the pump's generator voltage and/or its delivery rate and/or its rotational speed. This provision permits adjusting the determined brake pressure or nominal pressure, which is preferably calculated in a pressure model, initially from the delivery volume of the pump run-on, even when the pump is switched off, before the pump is actuated again by degrees on command of minimum pulses. For the new actuation of the pump by degrees, at least one of the following conditions must be satisfied:

a) the generator voltage is below a predetermined limit value and/or b) the delivery rate of the pump is below a predetermined limit value and/or c) the rotational speed of the pump is below a predetermined limit value.

All limit values lie in bands which appear after deactivation of the pump, that means, below the actuation quantities of the minimum pulses. Preferably, pressure buildup is no longer possible below the limit values when the pump is switched off. Because the pump is actuated by minimum pulses and the pressure which is produced by the pump in its run-on, when the pump is switched off, is used for brake pressure increase, and the pump is actuated again only by degrees according to the brake pressure or nominal pressure determined in dependence on its generator voltage, and/or delivery rate, and/or rotational speed, the emission of noise is reduced. This is due to the fact that a lower system pressure level occurs and noises of overflow caused in the overflow valve are reduced or totally avoided. The hydraulic components, especially the pump and the separating valve, are exposed to reduced load. In addition, control quality is enhanced by the easier and more precise approach to the pressure required.

The difference in pressure between the inlet side and the outlet side of the inlet valve can be detected to open a closed inlet valve. When this difference in pressure exceeds a critical value, the mentioned hydraulic pump can be switched on briefly in order to cause pressure buildup at the inlet valve of the inlet side. This decreases the difference in pressure, and the valve returns to its open (normally deenergized) position. The need for the four non-return valves which respectively by-pass one of the inlet valves is thereby obviated.

DETAILED DESCRIPTION OF THE PREFERRED EMBODIMENTS

Figure 1:
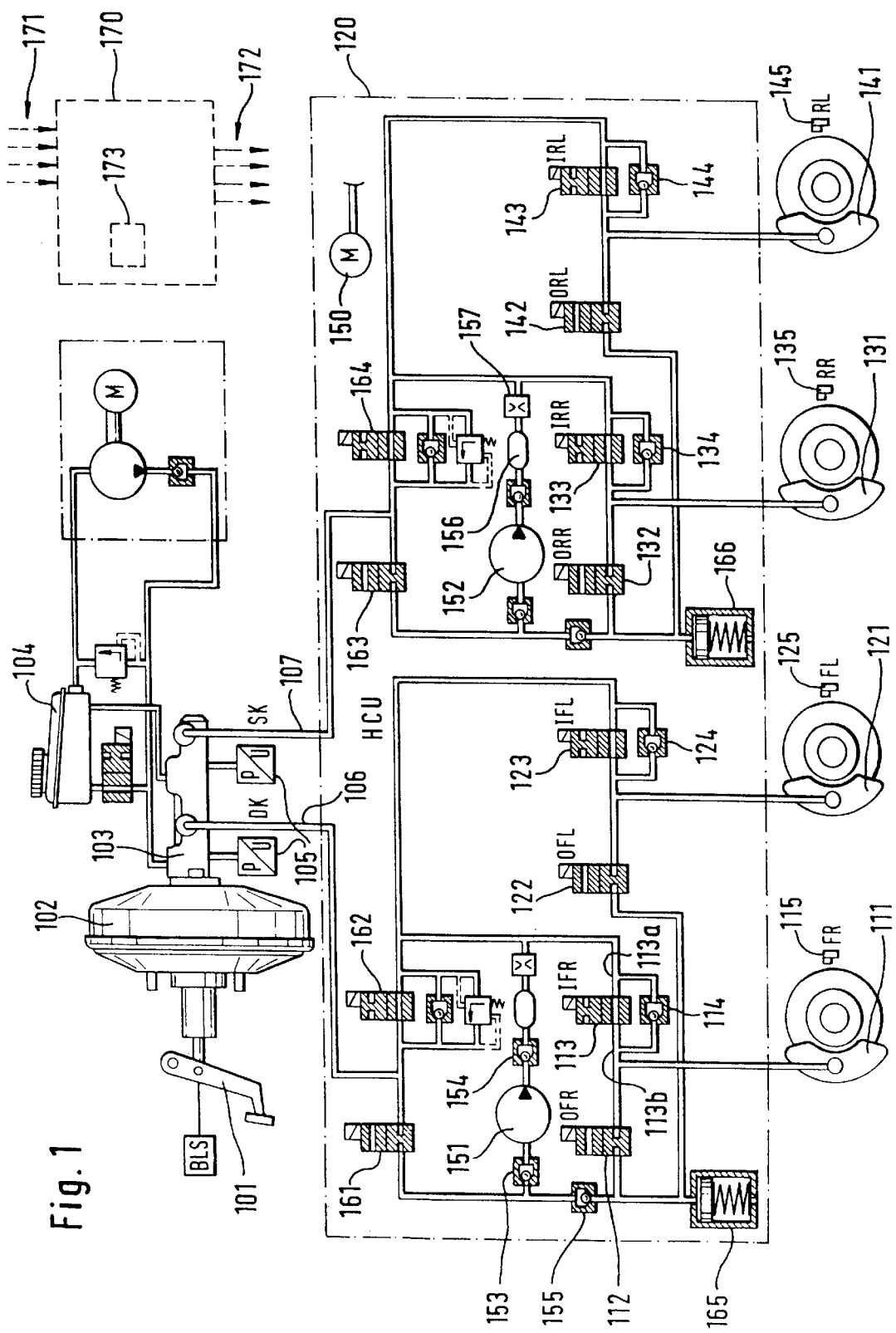
FIG. 1 is a view of a brake system in which the present invention can be implemented.

FIG. 1 shows a schematic view of basic components of a brake system with a front-wheel/rear-wheel allotment. Reference numeral 101 designates a brake pedal, 102 a brake force booster, 103 a brake cylinder (tandem master cylinder), and 104 a hydraulic fluid reservoir. The master cylinder generates a brake pressure on the outlet side primarily in conformity with the driver's request indicated by way of the brake pedal 101. The brake pressure is conducted to the valve block 120 by way of hydraulic lines 106, 107. Also connected to the valve block 120 are the wheel brakes 111, 121, 131, 141. An inlet valve 113 and an outlet valve 112 are associated with a wheel brake 111. 113a designates the inlet side, 113b designates the outlet side of the inlet valve 113. Generally, the inlet valve is normally open and the outlet valve normally closed. On the inlet side, the inlet valve 113 receives pressurized hydraulic fluid from a pressure source, e.g., the master cylinder 103. Further, there is provision of a hydraulic pump 150, 151 for the wheel brake 111. In the embodiment shown, the hydraulic pump supplies hydraulic fluid, which is pressurized if necessary, to the inlet side of the inlet valve 113. 151 designates the mechanic part of the pump, for example, an eccentric pump provided in or on the valve block, 150 designates the electric part, for example, an electric motor. On the suction side, the pump 150, 151 is generally connected to a hydraulic fluid source. It is provided with hydraulic fluid from the master cylinder 103 in the embodiment shown.

Instead of adjusting the brake pressure, as in the state of the art, with maximum operation of the pump 150, 151 by a limitation on the suction side (by means of a first valve 151) or by a controlled reduction on the delivery side by means of inlet valve 113, the pump itself is used as a control element. It is actuated by degrees, for example, according to a determined brake pressure and/or according to a desired nominal pressure. The result is that the pump is no longer switched on or off only. Rather, intermediate conditions are actuated so that the entire operating range of the pump is utilized. For example, the electric drive 150 of the pump 150, 151 can receive pulse-width-modulated signals or signals with a variable amplitude. The general concept is that, the energy supply, or the rotational speed, or the delivery rate of the pump can be actuated in a variable or continuous manner between the extreme values (zero or maximum value). Then, it is almost hardly necessary to actuate the first valve 161 or the inlet valve 113 for control in order to adjust the brake pressure. For the sake of completeness, the other components or the entire structure of the brake system will still be explained: the pump 150, 151 is interposed between a suction-side non-return valve 153 and an outlet-side nonreturn valve 154. Interposed between the outlet of the pump 150, 151 and the primary pressure source or master cylinder 103 is a second valve 162 which can be closed, for example, when the pump 150, 151 is in operation. This ensures that the fluid supplied will propagate through the inlet valve into the wheel brake and will not flow backwards in undefined directions. Reference numeral 165 designates a low-pressure accumulator which receives the hydraulic fluid flowing out through the outlet valve 112. 155 designates a non-return valve. The first valve 161 is generally normally closed, while the second valve 162 is generally normally open. Connected in parallel to this valve is a pressure-relief valve. In the embodiment shown, the pump 150, 151 operates for two wheel brakes. It can be stated in general that individual inlet valves 113, 123, 133, 143 and outlet valves 112, 122, 132, 142 as well as non-return valves 114, 124, 134, 144 are provided for each of the wheels or for each wheel brake 111, 121, 131, 141. With respect to the first and second valves 161, 163, 162, 164, they can be constructed such that they are respectively provided for one pair of wheel brakes. In the embodiment of FIG. 1, the pump 150, 151 is assigned to the wheel brakes 111, 121 of the front axle, while the pump 150, 152 is assigned to the wheel brakes 131, 141 of the rear axle. 156 refers to a supply reservoir, 157 to a pressure restrictor. An electric motor 150 actuates the two mechanic pumps 151, 152 in the embodiment shown. However, individual motors or generally electric drives may also be provided.

Figure 2:
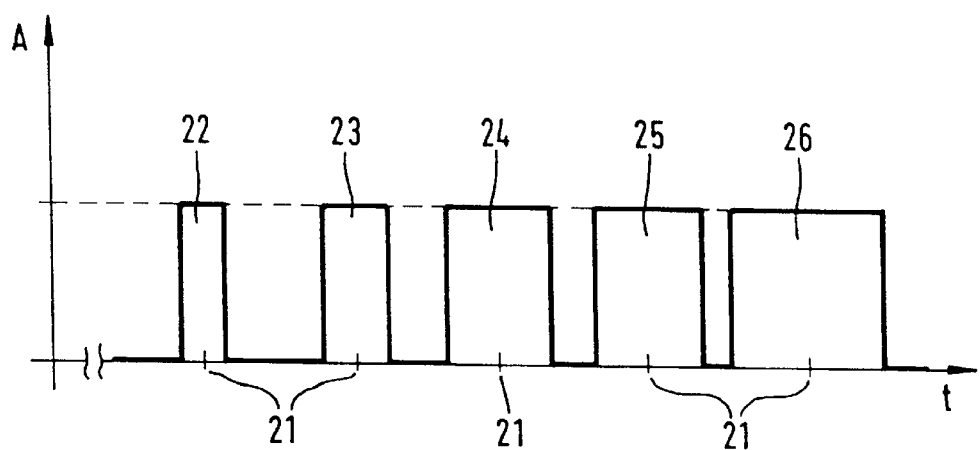
FIG. 2 is an example of an actuation of a pump according to the present invention.

FIG. 2 shows an example of a pulse-width-modulated signal as it can be generated for the actuation of the electric motor 150 of the pumps 150 to 152 and sent to the motor. Reference numeral 21 designates a time slot pattern in a schematic way, within which pulses are generated. These pulses can last for a longer or shorter period of time. Pulses 22 to 26 are shown, with their duration increasing. Accordingly, the energy supply to the motor 150 also increases and, in conformity therewith, the rotational speed or the delivery rate of the pump. This permits indirectly adjusting the brake pressure.

Figure 3:
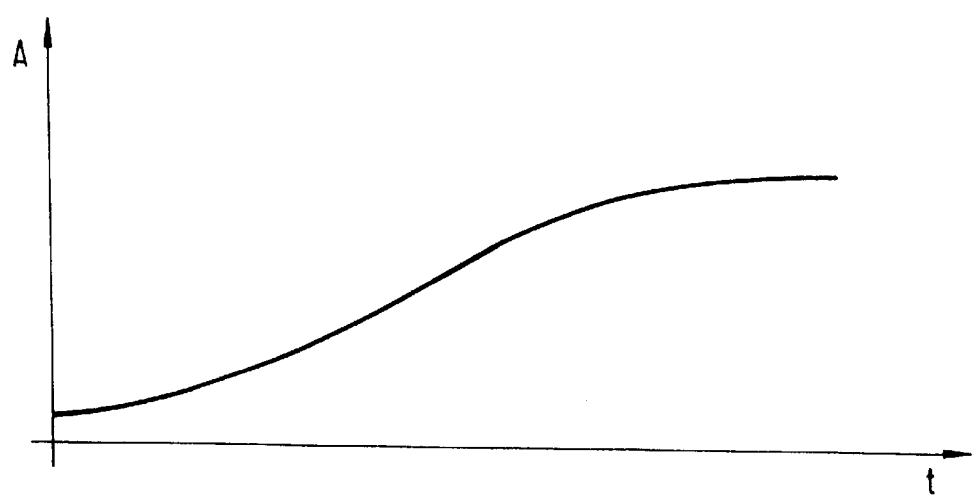
FIG. 3 is another example of an actuation of a pump according to the present invention.

Another embodiment is shown in FIG. 3. According to this embodiment, a continuous analog signal which is variable in its amplitude is sent to the motor 150. This may e.g. be a gradually increasing direct current. In defined cases, the curve in FIG. 3 may also be the envelope of an alternating current, for example.

The actuation of the pump may be part of a control or regulation. This is indicated by reference numerals 170–172 in FIG. 1. Reference numeral 170 designates a controller which receives input signals 171 and outputs output signals 172. The input signals may be sensor signals or signals from a vehicle data bus or internal signals of other control components. The actuating signals 172 can be signals for the electrically actuated valves and for the motor 150. The signals for the motor 150 (for example, according to FIG. 2 or FIG. 3) will then be predetermined in conformity with defined control objectives and sent to the motor.

In the valve configuration described (first valve is normally closed, second valve is normally open, inlet valve is normally open, and outlet valve is normally closed), the inlet and outlet valve would hence adopt their deenergized condition in the brake pressure adjustment according to the present invention. Also, the first valve 161 is being opened to supply fluid to the suction side of the pump 150, 151, while the second valve 162 is being closed to prevent discharge of the fluid and, more particularly, shortcircuit of the pump. In this sense, the same applies to the valves 163 and 164. Brake pressure reduction which may become necessary in the brake pressure adjustment of the present invention can be effected by opening the outlet valve 112 and/or by opening the second valve 162.

In modern vehicle brake systems determining the actual brake pressure is accomplished by using a model. This means that the brake pressure in the individual wheel brakes is calculated starting from known brake system parameters and by taking into consideration the various signals which influence the respective brake pressure. When there is transition to the brake pressure adjustment according to the present invention (by actuation of the pump 151 as described hereinabove), the model-based calculation of the actual brake pressure may be supplemented or modified to such effect that one or more of the pump characteristics or these pump characteristics in total can be considered in the model.

Special advantages are achieved when pressure sensors are installed in proximity to the inlet valves and, especially, on the outlet side 113b of the inlet valves. This applies in particular for the wheels of the driven axle when the brake pressure adjustment of the present invention serves for traction slip control.

It can be stated in general that the method of the present invention and the device of the present invention are especially well suited for traction slip control. Usually, the pumps 150–152 have a comparatively small capacity so that they are appropriate in particular for moving small volumes. In dependence on the dimensioning of the pump, the method of the present invention can also be used for any other active brake pressure adjustment such as TCS, ESP, and like systems.

In view of the above, the hydraulic circuit diagram of FIG. 1 shows a conventional configuration because the inlet valves 113, 123, 133, 143 are respectively furnished with nonreturn valves 114, 124, 134, 144. These non-return valves permit closing of the inlet valves because a great 'inverted' difference in pressure is avoided. A method and a device will be disclosed hereinbelow by which the four non-return valves 114, 124, 134 and 144 can be economized. The explanation is given with respect to valve 113. The same explanations apply to the other inlet valves accordingly. Opening of the inlet valve 113 can become impossible (generally in the transition from the energized to the deenergized condition) when the pressure on the outlet side (at 113b) is considerably higher than the pressure on the inlet side (at 113a). Non-return valves 114 have been provided so far to prevent such an inverted difference in pressure. The difference in pressure may now be determined according to the present invention. When the pressure P113b on the outlet side is in excess of the pressure P113a on the inlet side by more than a threshold value Psch (corresponding to P113b–P113a>Psch), a pressure increase on the inlet side 113a of inlet valve 113 can be produced by pump 150, 151, with second valve 162 preferably closing to this end. Increase of the inlet-side pressure causes reduction of the difference in pressure which has previously rendered opening of the valve impossible. This makes opening of the valve possible again, even if a balance in pressure between inlet side and outlet side is not possible without non-return valve 114.

The pressure rise at the inlet valve on the inlet side can be effected according to a method described hereinabove. Because the volume to be pressurized is comparatively small, a shorttime operation of the pump can be sufficient.

Figure 5:
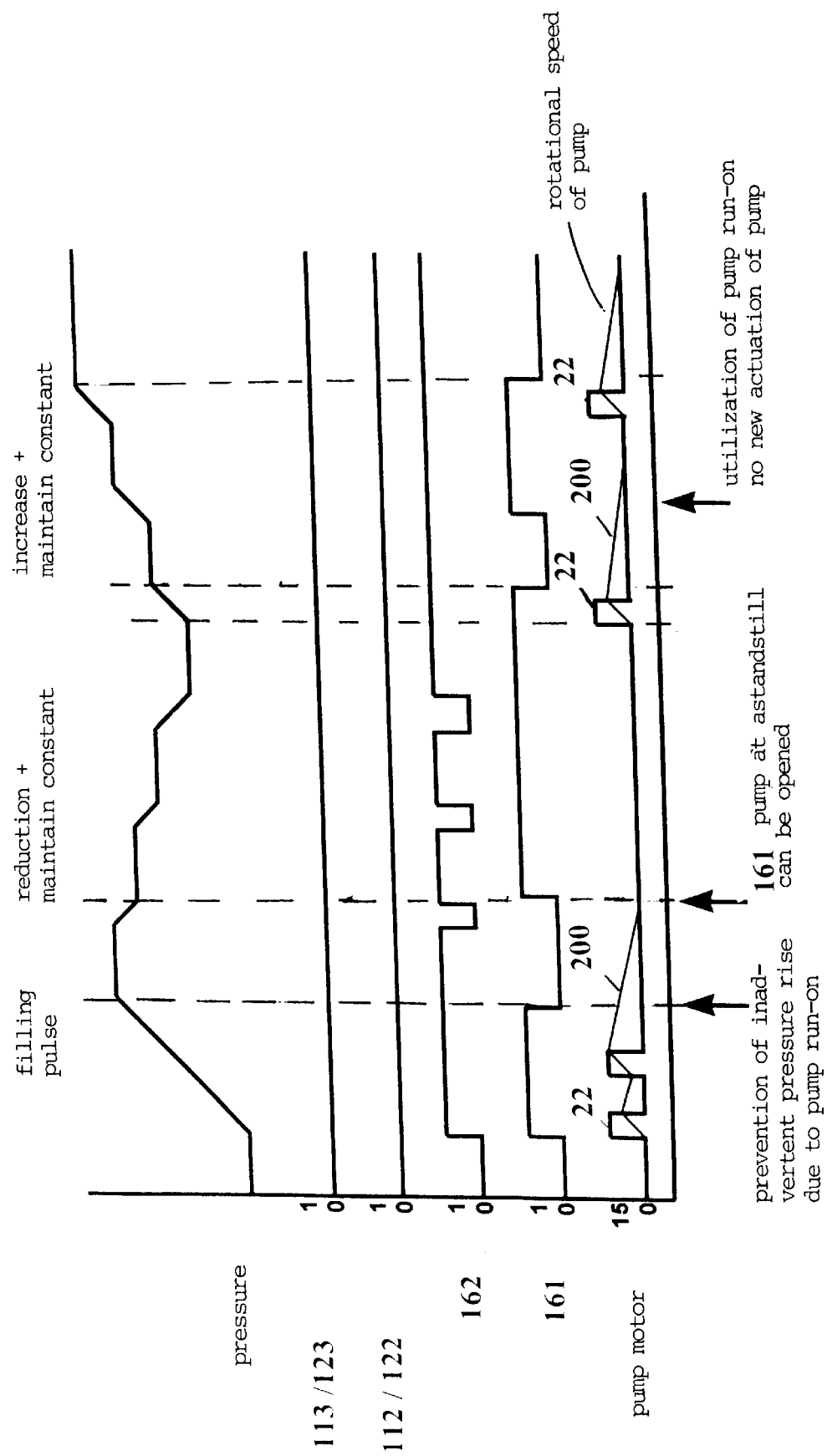
FIG. 5 is a timing diagram for the actuation of the electric pump motor.

The actuation of the electric motor 150 of the pumps 151, 152 with pulse-width-modulated minimum current pulses 22 between 5 and 20 milliseconds (ms), preferably between 12 and 16 ms, is illustrated in FIG. 5. As is shown in the FIG. 1 embodiment, the brake system may exhibit a front-axle/rear-axle circuit allotment or, preferably, a diagonal circuit allotment.

Pumps 151, 152 are actuated by degrees according to the calculated brake pressure or nominal pressure of the wheels in a traction slip control operation in dependence on their generator voltage so that the delivery volume of the pump run-on is taken into account. In this arrangement, the generator voltage produced by the pump motor is evaluated during the pulse pauses as an indicator of the pump rotational speed and compared with a nominal value for the pump rotational speed. The new quantity for the pump actuation control is derived from the difference. Upon response of the traction slip control, the control or regulation 170–172 produces minimum pulses 22 in predetermined time intervals of rapid succession, by means of which the pump in the wheel brakes of the drive wheels builds up pressure. Due to the minimum pulses 22 of rapid succession, the clearance that prevails in the wheel brakes at the commencement of control is overcome and the dynamics of pressure buildup increased accordingly. The normally closed (NC) first valve 161 is open then. The normally open (NO) second valve 162 is closed so that the pump supplies the hydraulic fluid from the master cylinder 103 and the hydraulic fluid reservoir 104 into the wheel brakes 111, 121 by way of the NO inlet valves 113, 133. The characteristic curve for the rotational speed of the pumps 151 or 152 is designated by 200. As is shown by characteristic curve 200, the pump will run on after the actuation with the last minimum pulse 22 with decreasing rotational speeds, and will deliver hydraulic fluid. To prevent an inadvertent pressure rise in the wheel brakes due to this pump run-on, the first valve 161 closes until the rotational speed of the pump falls below a predetermined limit value or reaches it, and the said limit value can also be zero. When hydraulic fluid prevails in the low-pressure accumulator 165, the NO inlet valves 113, 133 will be closed in one embodiment when the pressure level is reached. Preferably, in a second embodiment, the volumes that prevail in the low-pressure accumulator or in the conduits are calculated by the pressure model and taken into consideration in the actuation of the pump and of the first valve.

The second NO valve 162 remains closed. The brake pressure introduced into the wheel brakes is maintained at the nominal pressure which corresponds to the pressure requirement calculated by way of actuation of the pump by minimum pulses 22. In the event that traction slip control necessitates a reduction of the brake pressure in the wheel brakes, e.g. because the coefficient of friction of the roadway underground has changed, the second NO valve 162 will be opened, and the hydraulic fluid flows back into the master brake cylinder 103 by way of the inlet valves 113, 123 and the second valve 162.

The first NC valve 161 will open after a rotational speed of the pump has been detected by way of the generator voltage of the motor, and values have reached or fall short of the limit value of this rotational pump speed. Hydraulic fluid flows through the first valve 161 into the conduit and/or into chambers between the first valve 161 and the pump 151 provided for volume take-up and, thus, is available directly at the inlet of the pump 151. Further phases of pressure reduction and phases in which the pressure is maintained constant are triggered by opening and closing the second NO valve 162. The first NC valve 161 is open or closed during this phase.

In the 'pressure buildup' phase, the motor 150 of the pump is driven by one or more minimum pulses 22. The rotational speed 200 of the pump and, hence, its delivery rate rises continuously during energy supply to the motor 150. Brake pressure is introduced into the wheel brakes when the first NC valve 161 is open. The second NC valve 162 is closed. As is shown in FIG. 5, the pump continues to rotate with the motor deenergized at decreasing rotational speeds, i.e., the pump run-on. The delivery rate of the pump, with the motor deenergized, is used totally or partly for pressure buildup. Accordingly, the first NC valve 161 is not closed until the pressure requirement calculated in the control or regulation 170–172 corresponds to the actual pressure in the wheel brakes. In this arrangement, the actual pressure is reached, when the motor 150 of the pump is deenergized, by partly using the pump run-on. The pressure rise is limited by closing the first NC valve 161.

For the further increase in pressure the first valve 161 is opened, with the motor 150 deenergized, when a rotational speed of the pump is sensed by way of the generator voltage generated by the pump motor. The pressure buildup in the wheel brakes is effected by way of the delivery rate of the pump out of said's run-on until the value reaches the limit value for the rotational speed of the pump or remains under it. The limit value and, hence, the rotational speed of the pump is preferably zero. Subsequently, the motor 150 of the pump is actuated by a minimum pulse 22 in case there is a pressure requirement. Hydraulic fluid is introduced into the wheel brakes until the nominal pressure from the pressure requirement corresponds to the actual pressure in the wheel brakes. The first valve 161 closes.

The pressure buildup is characterized by the phases 'increase-maintain constant - increase'. The inlet valve 113 is open during pressure increase, that is during the phases increase, remain constant, increase. The outlet valve 112 is closed. The phases are produced by the adjustment of the actual pressure in the wheel brakes by making use of the pump run-on. Their succession is variable. It depends on whether a pump run-on is sensed at the time the pressure requirement is detected. The actuation of the motor 150 is reduced by utilizing the pump run-on.

Figure 4:
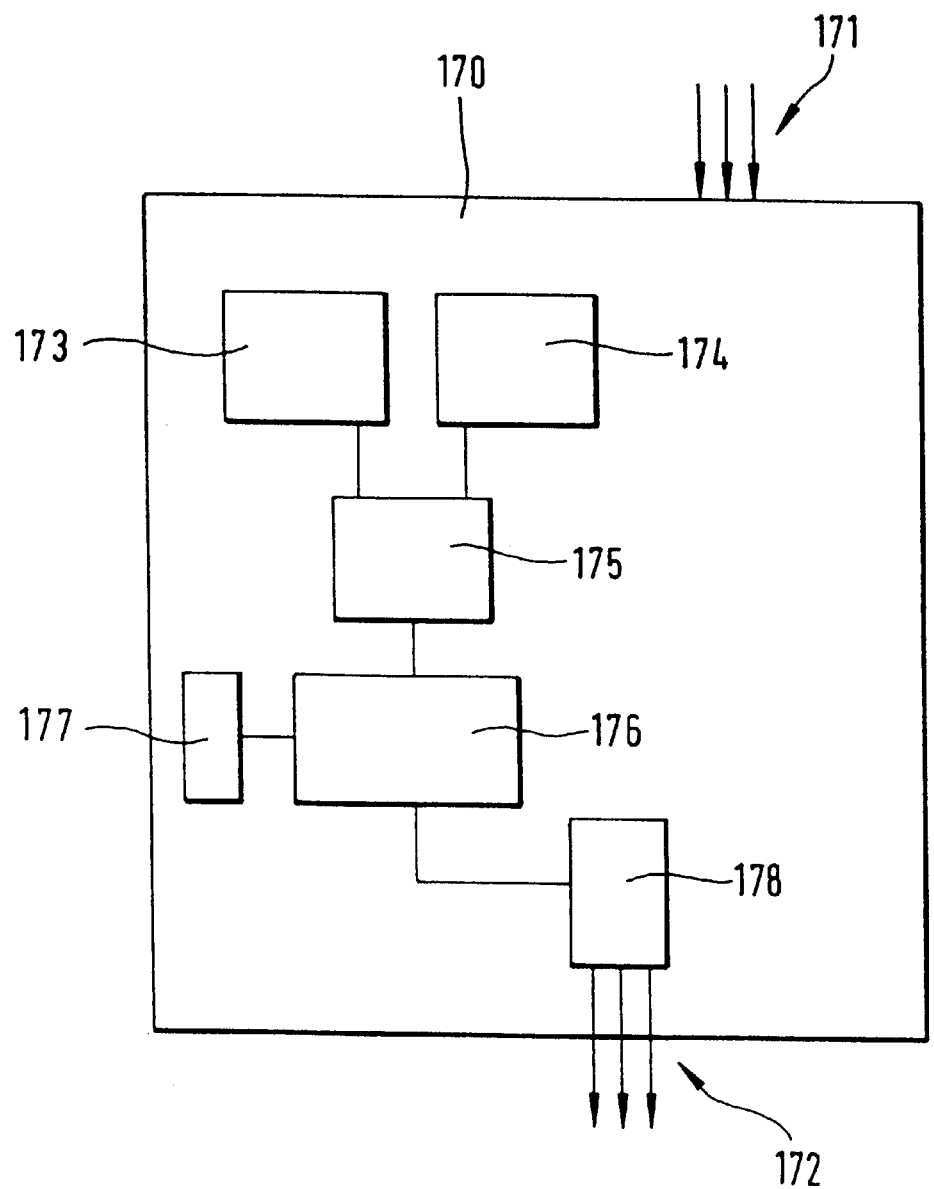
FIG. 4 is a view of a device for opening an inlet valve.

FIG. 4 shows a device for opening an inlet valve. It may be provided in the control 170, for example. In addition to the components illustrated in FIG. 4, the control 170 comprises further, non-illustrated components for performing other controlling and regulating objectives. Reference numeral 173 represents a pressure model by which the actual pressure in the wheel brake is determined (corresponding to the outlet-side pressure P113b at the inlet valve). 174 represents the inlet-side pressure P113a as it can result, for example, according to sensor values which are determined e.g. by sensors 105 at the master cylinder. The difference is produced in 175. In reference numeral 176, the difference is compared to a threshold value which is taken from a device 177 (memory, register, characteristic curve, or similar components). When the difference from 175 exceeds the threshold value from 177, the decision device 176 will output a signal which causes the production of appropriate output signals 172 in a generation device 178, wherein output signals for the motor 150 and the first and second valve 161, 162 are produced in particular.

Still further conditions for the mentioned intervention can be polled in the generation device 178, in case of need. For example, the measure can be stopped when a brake intervention by the driver is found out, unstable driving was detected, or similar conditions. Instead of a pressure model 173, sensor values may also be taken into consideration, if available. This is especially the case when sensors are fitted at the outlet side of the inlet valves.

Because it is generally required to pressurize only a very small volume (between the inlet valves 113, 123 and the second valve 162) for the success of the measure of the present invention, a brief operation of the pump 150, 151 can be sufficient to cause the necessary pressure rise for a reduction of the difference in pressure. Insofar, a brief, full activation of the pump, possibly only for a few rotations of an eccentric of an eccentric pump, can be sufficient. However, the pump can also be actuated according to the method described hereinabove.

Accordingly, the same explanations apply to the inlet valves 123, 133, 143 with respect to their respectively associated pumps, valves, and sensors.

What is claimed is:

1. Method of brake pressure adjustment in a vehicle brake system equipped with hydraulic brake fluid operated upon by an electric hydraulic pump, comprising the steps of:
    detecting a prevailing hydraulic brake pressure or determining a nominal hydraulic brake pressure,
    activating the electric hydraulic pump by degrees according to the detected hydraulic brake pressure or the nominal hydraulic brake pressure in consideration of a volume of hydraulic fluid that will be delivered by the hydraulic pump under a pump run-on condition.

2. Method as claimed in claim 1, further including adjusting the delivery rate of the electric hydraulic pump according to the nominal hydraulic brake pressure.

3. Method as claimed in claim 1, further including the step of generating pulse-width-modulated current pulses for controlling the electric hydraulic pump.

4. Method as claimed in claim 3, wherein the electric hydraulic pump receives pulse-width-modulated current pulses between 5 and 20 milliseconds (ms).

5. Method as claimed in claim 1, further including the step of actuating the electric hydraulic pump by degrees according to the determined hydraulic brake pressure or nominal hydraulic brake pressure in dependence on a voltage applied to said electric hydraulic pump, or a hydraulic delivery rate of said electric hydraulic pump, or a rotational speed of said electric hydraulic pump.

6. Method as claimed in claim 1, wherein the electric hydraulic pump is actuated by degrees when at least one of the following conditions is satisfied:
    a) a generator voltage is below a predetermined limit value, or
    b) a hydraulic delivery rate of the pump is below a predetermined limit value, or
    c) a rotational speed of the pump is below a predetermined limit value.

7. Method as claimed in claim 1, wherein the determined hydraulic brake pressure or nominal hydraulic brake pressure is adjusted as a function of the volume of hydraulic fluid that will be delivered by the hydraulic pump, after electric power is disconnected from the pump.

8. Method as claimed in claim 1, wherein the electric hydraulic pump receives an electric current with an adjustable amplitude.

9. Method as claimed in claim 1, wherein the electric hydraulic pump delivers the hydraulic fluid to an inlet side of an inlet valve of a wheel brake, and during a brake pressure adjustment a suction side of the electric hydraulic pump is connected to a hydraulic fluid source by way of a first valve, and an inlet and outlet valve of the wheel brake are rendered deenergized.

10. Method as claimed in claim 9, wherein a connection between the inlet side of the inlet valve and the hydraulic fluid source is interrupted by means of a second valve during brake pressure adjustment.

11. Method as claimed in claim 10, further including the step of decreasing brake pressure by opening the inlet valve or the outlet valve.

12. Method as claimed in claim 10, further including measuring the hydraulic brake pressure on the inlet side or outlet side of the inlet valve of the wheel brake.

13. Method as claimed in claim 9, wherein the adjusted brake pressure is determined by way of a model which takes into consideration one or more characteristics of the electric pump.

14. Method as claimed in claim 9, further including the steps of:
   determining the hydraulic pressure difference between the outlet-side and the inlet-side of an inlet valve of the vehicle brake system,
   and generating a pressure rise on the inlet side of the inlet valve by means of said electric hydraulic pump.

15. Method as claimed in claim 14, wherein the electric hydraulic pump is operated for a defined duration.

16. Device for brake pressure adjustment in a vehicle brake system, comprising:
   an electric hydraulic pump, a device for detecting a prevailing hydraulic brake pressure or determining a nominal hydraulic brake pressure,
   an actuation device for actuating the electric hydraulic pump by degrees according to the determined hydraulic brake pressure or the nominal hydraulic brake pressure in consideration of a delivery volume caused by a pump run-on condition.

17. Device as claimed in claim 16, wherein the actuation device adjusts an electrical power delivered to the electric hydraulic pump, or a rotational speed of the electric hydraulic pump, or hydraulic fluid delivery rate of the electric hydraulic pump according to the nominal pressure.

18. Device as claimed in claim 17, wherein the actuation device generates pulse-width-modulated electrical current pulses for the electric hydraulic pump.

19. Device as claimed in claim 18, wherein the actuation device generates an electrical current with an adjustable amplitude for the electric hydraulic pump.

20. Device as claimed in claim 16, wherein an outlet of the hydraulic pump is connected to an inlet side of an inlet valve of a wheel brake, and during brake pressure adjustment, a suction side of the electric hydraulic pump is connected to a hydraulic fluid source by way of a first valve, and the inlet valve of the wheel brake is deenergized.

21. Device as claimed in claim 20, further including a second valve which interrupts the connection between the inlet side of the inlet valve and the hydraulic fluid source during brake pressure adjustment.

22. Device as claimed in claim 21, wherein the second valve is opened for brake pressure reduction.

23. Device as claimed in claim 22, further including a model for determining the brake pressure which takes into consideration characteristics of the electric hydraulic pump.

24. Device as claimed in claim 23, wherein said inlet valve includes an outlet side, further including a sensor on the inlet side or outlet side of the inlet valve which measures the brake pressure of the wheel brake.

25. Device as claimed in claim 24, further including a detection device for detecting the hydraulic pressure difference between the outlet-side of the inlet-side of the inlet valve, and a hydraulic pump.

26. Device as claimed in claim 24, wherein the hydraulic pump is operated for a defined duration.

* * * * *

UNITED STATES PATENT AND TRADEMARK OFFICE
CERTIFICATE OF CORRECTION

PATENT NO.   : 6,499,812 B1
DATED        : December 31, 2002
INVENTOR(S)  : Ralph Gronau, Tobias Scheller and Jurgen Woywod It is certified that error appears in the above-identified patent and that said Letters Patent is hereby corrected as shown below:

Column 9,
Line 4, change "opening the inlet valve" to -- opening the second valve --.
Line 11, change "of the electric" to -- of the electric hydraulic --.

Signed and Sealed this

Seventeenth Day of June, 2003

JAMES E. ROGAN
*Director of the United States Patent and Trademark Office*